United States Patent [19]

Vogelsang

[11] Patent Number: 5,193,654
[45] Date of Patent: Mar. 16, 1993

[54] HYDRODYNAMIC RETARDER WITH SHIFTABLE STATOR BLADE WHEEL

[75] Inventor: Klaus Vogelsang, Crailsheim, Fed. Rep. of Germany

[73] Assignee: Voith Turbo GmbH & Co. KG, Fed. Rep. of Germany

[21] Appl. No.: 681,185

[22] Filed: Apr. 5, 1991

[30] Foreign Application Priority Data

Apr. 5, 1990 [DE] Fed. Rep. of Germany ....... 4010970

[51] Int. Cl.⁵ .................... F16D 57/04; F03D 9/00; B60T 1/087
[52] U.S. Cl. .................................... 188/296; 188/290
[58] Field of Search .............. 188/290, 293, 294, 295, 188/296; 192/58 A; 60/330, 334, 342, 352, 356; 416/169 R, 197 C

[56] References Cited

U.S. PATENT DOCUMENTS

| | | | |
|---|---|---|---|
| 2,113,109 | 4/1938 | Mater | 188/296 |
| 4,004,660 | 1/1977 | Shore et al. | 188/296 X |
| 4,474,270 | 10/1984 | Vogelsang | 188/296 |
| 4,938,323 | 7/1990 | Höller et al. | 188/296 |

Primary Examiner—Matthew C. Graham
Assistant Examiner—Peter M. Poon
Attorney, Agent, or Firm—Ostrolenk, Faber, Gerb & Soffen

[57] ABSTRACT

The invention concerns a hydrodynamic retarder, the stator blade wheel of which can be brought into eccentric, nonaligned positions with respect to the rotor blade wheel. Either by formation of a blade free circumferential region in the blading of the stator blade wheel together with a longitudinal guide for eccentric shifting or by eccentric swingable mounting of the stator blade wheel, a directly proportional force is obtained from the corresponding braking torque in the stator blade wheel. This force represents a measure for the braking torque and serves as a characteristic value for a torque adjustment. This creates a simple control device with characteristic curves which requires a smaller retarder profile diameter in order to obtain given operating points. The advantage is the reduction of the outside dimensions, the weight and the expense for regulating the brake torque.

20 Claims, 2 Drawing Sheets

HYDRODYNAMIC RETARDER WITH SHIFTABLE STATOR BLADE WHEEL

BACKGROUND OF THE INVENTION

The present invention relates to a hydrodynamics retarder having a rotor blade wheel and a stator blade wheel arranged in a common housing, and more particularly to such a retarder wherein the stator blade wheel is shiftable eccentrically with respect to the rotor blade wheel.

A hydrodynamic retarder of the above type is known from Federal Republic of Germany Patent 31 13 408 which is equivalent to U.S. Pat. No. 4,474,270 issued Oct. 2, 1984 to Klaus Vogelsang for an ADJUSTABLE HYDRODYNAMIC BRAKE. That retarder serves as an energy converter in a wind driven power unit in order to convert the energy of the wind into heat, preferably with an interposed heat exchanger. It is necessary to adapt the characteristic curve of the retarder to the characteristic of the prime mover, for instance the wind driven power unit. In the known retarder, this adaptation is effected by a device which enables the stator blade wheel to be adjusted radially into an eccentric position with respect to the rotor blade wheel. The stator blade wheel is for this purpose fastened firmly eccentrically on a shaft so that the eccentricity can be brought about upon the rotation of the shaft relative to the rotor blade wheel. Upon rotation of the shaft bearing the stator blade wheel, the rotor and stator blade wheels can come into alignment or onto a common axis with each other in one shaft position. It is known to provide a linear guide for the stator blade wheel for enabling the eccentric repositioning of the two blade wheels.

If the retarder operates together with a wind driven power unit, there is cooperation of two fluid flow machines having the same basic characteristics, namely a course of the developed and the absorbed power which is parabolic with respect to the speed of rotation. In the known retarder, this circumstance enables the regulation to be limited to a fixed setting of a maximum value for the braking torque or the braking power of the retarder. Due to its own characteristics, the retarder consumes only a small amount of power when the wind driven power unit can develop only a small amount of power. Further adjustment for operation is not necessary, aside from totally emptying the operating fluid from the brake housing, for instance, for reasons of safety.

In addition, there are known possibilities for operating the retarder with different conditions of operation via a pressure control to influence the toroidal work chamber that is enclosed by the stator and rotor blade wheels. Depending upon the desired condition of operation, for instance, constant braking torque over a large range of speeds of rotation, then it is also to be taken into account that a larger profile diameter for the retarder is necessary. This is a negative influence for the use of such retarders in motor vehicles, particularly with regard to the structural size and the weight of the retarders.

SUMMARY OF THE INVENTION

The object of the present invention is to so improve a hydrodynamics retarder of the above described type that the adaptation to different operating conditions is possible by simple means and with minimum technical expense and with minimal weight change.

The invention provides a retarder control, which is substantially independent of pressure, through a targeted adjustment of the position of the two blade wheels of the retarder with respect to each other. The stator blade wheel is so mounted that the flow forces acting on the blades are converted both into a brake reaction torque and at the same time into a circumferential force which is proportional to the brake torque. The stator blade wheel thereby develops a force wherein the wheel itself strives for an eccentric position with respect to the rotor blade wheel.

The stator blade wheel is connected to a displacement device which exerts a displacement force on that wheel which is directed opposite to the force that is exerted by the stator blade wheel from its cooperation with the rotor blade wheel. This affords the possibility of moving the stator blade wheel, by variable pressure on the displacement device, into a very specific position with respect to the axis of the rotor blade wheel for developing a given braking torque. The force derived by the stator blade wheel from the brake reaction torque is thereby placed in equilibrium with the displacement force from the displacement device, which thereby represents directly a measure of the braking torque developed. The regulation of the braking torque thus extends still only to establishing a variable displacement force. As a result, the expense for a retarder control is greatly simplified.

In one embodiment, the stator blade wheel is guided by a linear guide on which a displacement device acts directly. The displacement device is developed as a piston-cylinder unit with a control piston. There is a normal plane which is perpendicular to the longitudinal axis of the linear guide, and which plane passes through the center of the stator blade wheel. In order to obtain a circumferential force which is proportional to the braking torque, a blade free region, from which at least one blade is missing, is provided in the stator blade wheel, on one side of the normal plane. This produces an imbalance of the circumferential force present parallel to the longitudinal axis of the lengthwise guidance so that a force is produced along the axis of the lengthwise guide which is proportional to the braking torque developed.

In another embodiment, the stator blade wheel is swingable around a pivot point that is located eccentrically outside the blading of the stator wheel blade. The brake torque of reaction developed in the stator blading acts also as a moment of rotation around that pivot point. There is also a displacement device for the stator blade wheel, which is developed as piston-cylinder unit, and that unit has a control piston so that a swinging movement of the stator blade wheel around the eccentric pivot point is possible with variable control pressure.

In each case, in one end position of the displacement device, the stator blade wheel is centrally opposite and axially aligned with the rotor blade wheel. The aligned positions of the two blade wheels are always reached when the force resulting from the control pressure in the displacement device is greater than the force developed from the braking torque in the stator blade wheel. The minimum braking torque is obtained when the brake housing is emptied of operating fluid so that the stator blade wheel assumes the extreme outwardly swung position and furthermore only air ventilation still prevails in the brake housing. This may be necessary for reasons of safety.

Other objects, features and advantages of the present invention will become apparent from the following description of the invention which refers to the accompanying drawings.

DESCRIPTION OF THE PREFERRED EMBODIMENTS

Figure 1:
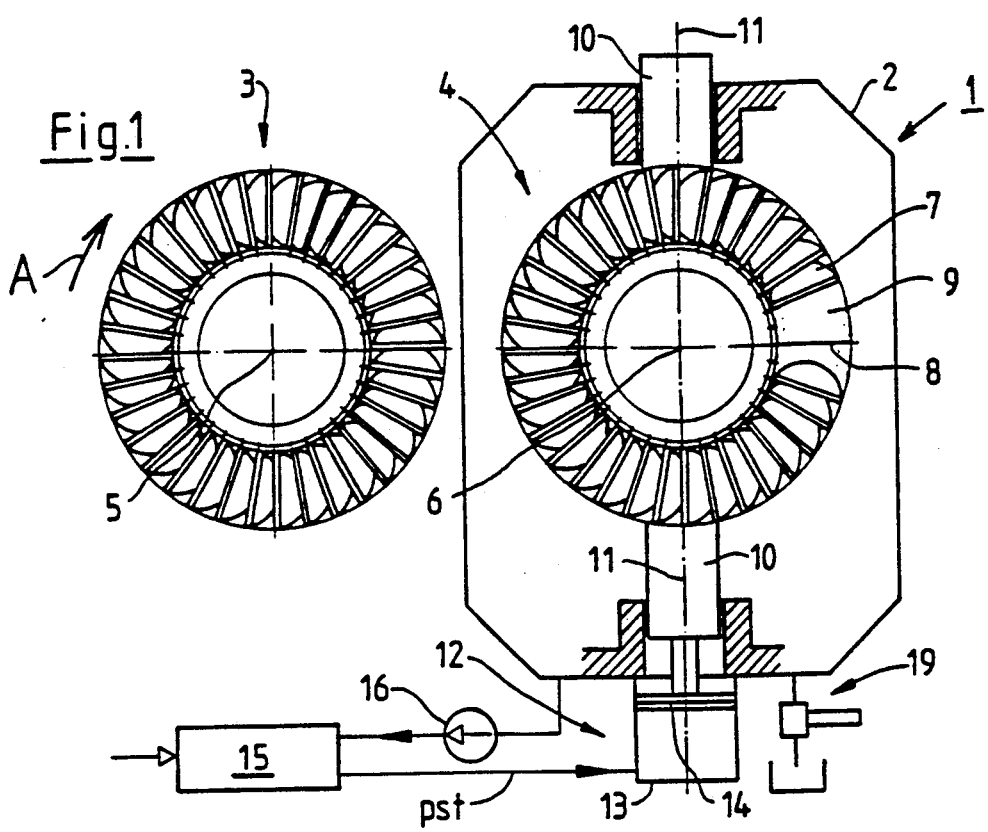
FIGS. 1 and 2 diagrammatically show a hydrodynamic retarder with stator longitudinal guidance and the retarder is respectively shown in two end positions of the stator.

FIG. 1 diagrammatically shows a hydrodynamic retarder 1 having a housing in which a rotor blade wheel 3, which is connected with a drive shaft (not shown), is arranged opposite, that is, blades extending toward blades, a stator blade wheel 4. The stator blade wheel is fixed against rotation in the housing. (To show the shapes of the blade wheels, the rotor blade wheel is shown outside the housing.) The two wheels have respective blading that is inclined and shaped as is known in such retarders. The respective bladings of the two wheels face each other and form a toroidal work chamber which can be filled with a usual operating fluid or liquid.

The stator blade wheel 4 is displaceable radially, eccentrically of the rotor blade wheel, by a longitudinal guide 10 which is movable along a longitudinal axis 11 that is perpendicular to the axis of rotation 5 of the rotor blade wheel 3. The stator shaft 6 can in this connection be concentrically aligned with the rotor shaft 5 at one of the end positions of the longitudinal guide 10 shown in FIG. 1.

A displacement device 12 is connected with the longitudinal guide 10 and surrounds the cylinder 13. The cylinder 13 has a control piston 14 in it, which is controllable by a variable control pressure pst. A source of pressure 16, which is developed as a pump, is connected with a control and regulating device 15 which produces a variable control pressure pst corresponding to a control command coming from the outside. The fluid for the pump may be the operating liquid of the retarder or, for instance, compressed air from the brake system can be used in the case of motor vehicle retarders.

The blading 7 of the stationary stator blade wheel 4 is provided with a blade free, relatively short arcuate length, circumferential region 9. At least one blade is absent, that is no blade is at the normal blade position for equally spaced blades. The blade free region lies on one side of the blading 7 in a plane 8 that passes through the stator axis 6 and that is perpendicular to the longitudinal axis 11 of the longitudinal guide 10. In this way, asymmetry in the blading 7 is produced on the opposite sides of the vertical longitudinal axis 11. Upon rotation of the rotor blade wheel 3 in the direction indicated by the arrow A (rotor blade wheel 3 shown tilted), an unbalanced force of reaction with respect to the blade free region 9 is produced in the direction of the longitudinal axis 11, which forces the stator blade wheel 4 down, out of the central position with respect to the rotor blade wheel 3. This force is directly proportional to the braking torque.

In order to bring the stator blade wheel 4 into a specified eccentric position with respect to the rotor blade wheel 3 and to produce a given braking torque which corresponds to the eccentricity of the stator blade wheel and to a set volume of fluid in the retarder, the displacement device 12 must develop a suitable opposing force. The force equilibrium is produced by the control piston 14 under the control of the variable control pressure pst. The highest moment of rotation is produced for a given constant speed of rotation always in the aligned axis positions of the stator and rotor shafts 5, 6. Upon increasing eccentricity of the wheel shafts, a smaller braking torque is produced and a smaller opposing force on the displacement device 12 is necessary in order to maintain the stator blade wheel 4 in the selected eccentric position. By displacement of the force equilibrium by means of the variable control pressure pst, a large characteristic field can be passed over in simple manner also in order to obtain a constant course of the braking torque.

Figure 2:
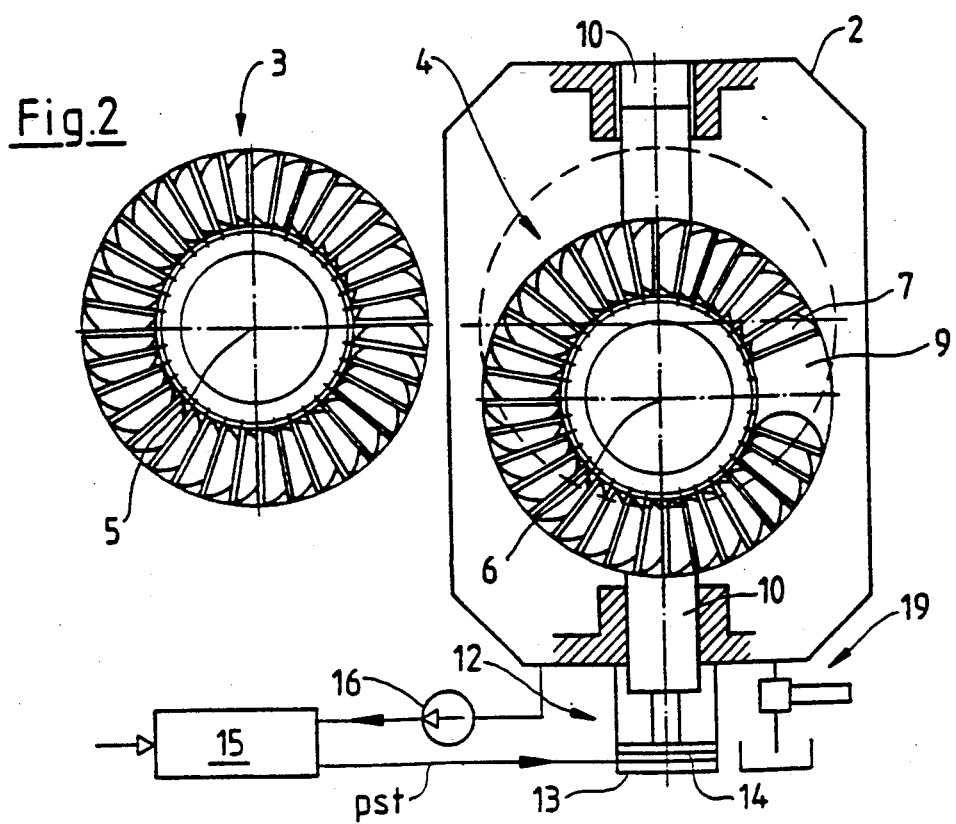

FIG. 2 shows the retarder of FIG. 1, with the stator blade wheel 4 having been displaced along the longitudinal guide 10 into its other extreme position. This may be the position at which the stator blade wheel 4 has been displaced by the entire radial height of the blades, which is equivalent to minimizing the braking torque.

Figure 3:
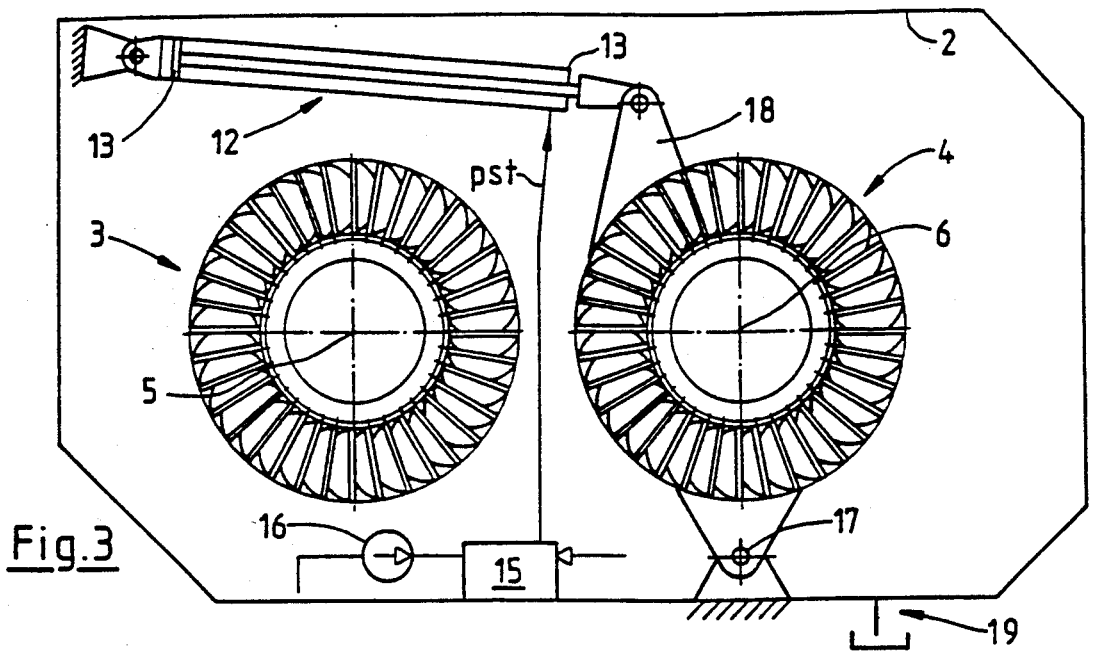
FIGS. 3 and 4 diagrammatically show such a retarder with a swingable stator blade wheel.
Figure 4:
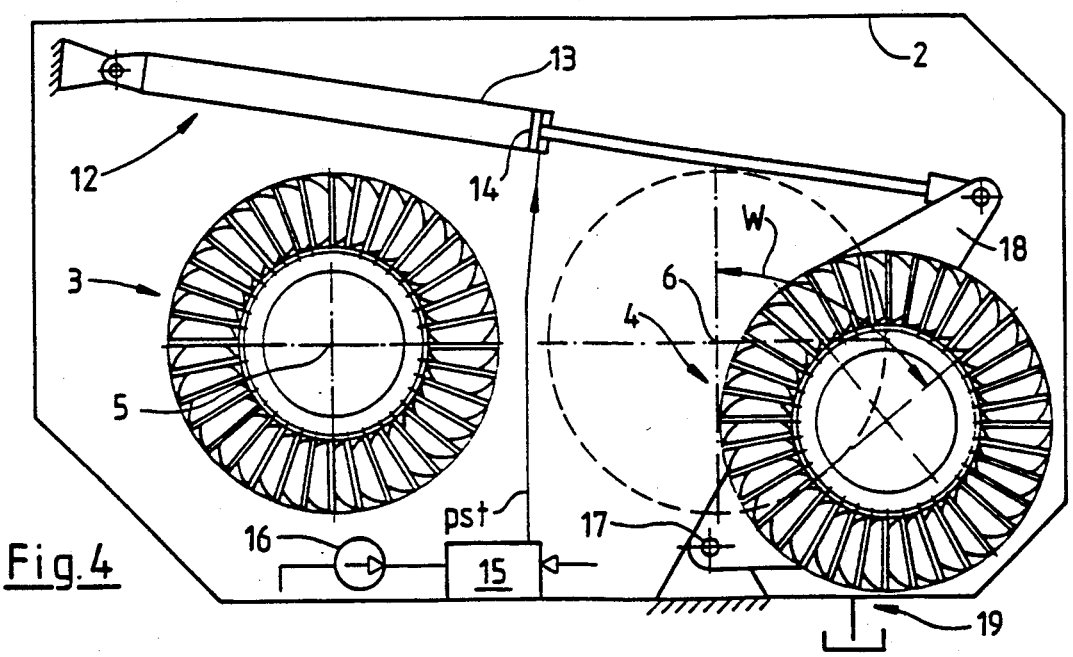

FIGS. 3 and 4 show a different type of the displacement device. The stator blade wheel 4 is mounted for rotation on a pivot 17 that is located eccentrically of the stator and radially outside the periphery of the blading 7. The blading 7 of the stator blade wheel has no circumferential region which is free of blades. The moment of rotation produced by rotation of the rotor blade wheel 3 also acts on the eccentric pivot point 17 and on the stator blade wheel 4 in the direction of rotation of the rotor. This causes eccentric positioning of the blade wheels with respect to each other. The stator blade wheel 4 can be brought into the eccentric position that is to be established by means of variable control pressure pst via a displacement device, including a pressure cylinder 13 and a control piston 14 driven by the cylinder, which acts on a support lever 18 on which the wheel 4 is positioned for swinging motion around the pivot point 17. The stator blade wheel 4, in this connection, carries out an arcuate swinging movement w. One end position is in this connection again the aligned position of the shafts 5, 6 of the blade wheels in FIG. 3. The other end position, as in the embodiment according to FIG. 2, is the position with an eccentricity corresponding to the radial height of the blading, shown in FIG. 4.

If the extreme eccentric position is not sufficient to reduce the braking torque with the working space of the brake housing filled with operating fluid, then in both embodiments, the brake housing 2 can be emptied of fluid via an emptying device 19, for instance, for reasons of safety.

Figure 5:
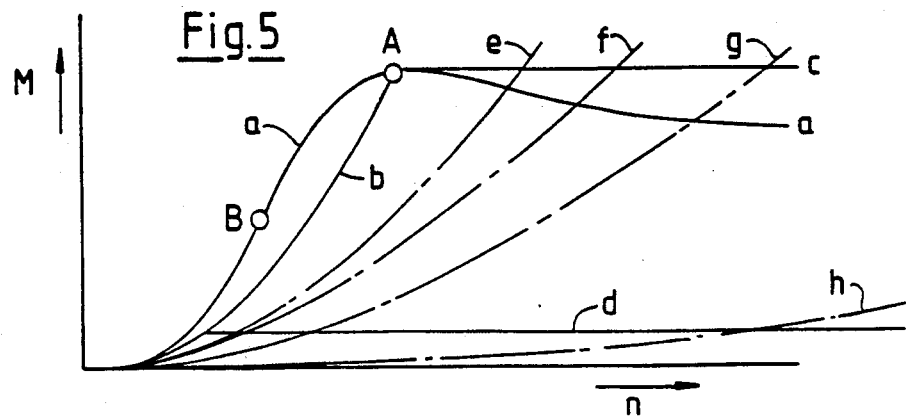
FIG. 5 is a comparative graph with different characteristic curves of retarders.

FIG. 5 shows a hydrodynamics retarder characteristic field with the braking torque M being plotted over the rotor speed of rotation n. Curve a shows the course of the braking torque for a known pressure controlled retarder. From the origin up to the operating point B, the torque has a parabolic course; up to the operating point A there is then a typical soft transition to an approximately constant course of the braking torque.

If the retarder is designed so that at the operating point A, it produces maximum torque with minimum speed of rotation, then the retarder must have a size of profile corresponding to the parabola up to point B and therefore a relatively large diameter, high weight and large outside dimensions.

By means of the invention, the operating point A can be controlled because by a direct control of torque, the horizontal and flat control curves c and d are attainable, which are limited between the origin and the operating point A by a flatter parabola b. The flatter parabola b corresponds to a smaller retarder profile diameter, which leads to more favorable retarder dimensions.

The parabola b corresponds in this connection to the aligned positions of the rotor and stator shafts 5, 6. Increasing eccentricity of these shafts produces flatter parabolas e to h for the braking torque, the parabola h corresponding to the greatest eccentricity. The transition takes place in this connection continuously and without steps. Along the control curve c, for instance, the displacement force of the control piston, i.e. correspondingly, the control pressure pst, is also constant, since the control pressure is directly proportional to the braking torque M. As a result, the eccentricity is variable with constant control pressure pst and accordingly constant braking torque. If a braking process is introduced at high speed of rotation, then, with a predetermined control pressure, a large eccentricity is initially brought about between the rotor and stator shafts 5, 6. With a decrease in the speed of rotation, the eccentricity decreases, the braking torque follows the parabolas g to e. With the shafts aligned, the steepest parabola b is obtained, which passes through the design point A. This process of self reducing eccentricity is an automatically proceeding equilibrium pendulum process. The flow in the retarder and the action on the stator blading 7 are so influenced that with high speed of rotation, mere slight overlap of the blades and therefore large eccentricity is sufficient for producing the same braking torque as with low speed of rotation and high overlapping of the blading and therefore low eccentricity or aligned position.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hydrodynamic retarder comprising a housing for containing operating liquid;
   a rotor blade wheel supported for rotation in the housing and including rotor blading thereon;
   a relatively non-rotating stator blade wheel supported in the housing and including stator blading thereon, the stator blading being opposite the rotor blading, such that the stator balding and the rotor blading may cooperate with the operating liquid for hydrodynamic retarding;
   support means for supporting the stator blade wheel for being displaced eccentrically in position with respect to the rotor blade wheel between more and less aligned conditions thereof;
   a pressurized fluid displacement device connected with the stator blade wheel for adjusting the eccentric position of the stator blade wheel with respect to the rotor blade wheel, and the stator blade wheel exerting a brake reaction force which moves the stator blade wheel eccentrically and the displacement exerting an opposed displacement force, the displacement device being adjustable to apply an adjusted displacement force on the stator blade wheel which is adjustable proportional to a desired braking moment.

2. The hydrodynamic retarder of claim 1, wherein the stator blade wheel is supported in the housing to e non-rotatable with respect to the housing and the rotor blade wheel is supported for rotating with respect to the stator blade wheel in the housing.

3. The hydrodynamic retarder of claim 1, wherein the support means for the stator blade wheel comprises a linear guide for guiding the stator blade wheel to move eccentrically linearly.

4. The hydrodynamics retarder of claim 3, wherein the linear guide is connected directly with the displacement device for the displacement device to act on the linear guide.

5. The hydrodynamic retarder of claim 4, wherein the displacement device comprises a piston-cylinder unit including a cylinder and means for delivering controllable pressure to the cylinder of the unit, and a control piston in the cylinder, said piston being operatively connected with the linear guide.

6. The hydrodynamic retarder of claim 5, further comprising a pressure source connected with the cylinder of the displacement device and a control and regulating device between the pressure source and the displacement device for controllably adjusting the pressure acting on the control piston of the displacement device;
   the cylinder being so connected with the displacement device that the central position of the stator blade wheel with respect to the rotor blade wheel is obtained upon feeding of highest pressure into the cylinder.

7. The hydrodynamic retarder of claim 3, wherein there is a plane that passes through the center of the stator blade wheel and is perpendicular to the axis of motion of the linear guide; the stator blading having a circumferential region on one side of the plane where the stator blading is absent for developing a force on the stator blade wheel which causes the stator blade wheel to move along the linear guide and against the action of the displacement device upon rotation of the rotor blade wheel.

8. The hydrodynamic retarder of claim 1, wherein the displacement device comprises a piston-cylinder unit including a cylinder and means for delivering controllable pressure to the cylinder of the unit, and a control piston in the cylinder, said piston being operatively connected with the support means for the stator blade wheel.

9. The hydrodynamic retarder of claim 8, further comprising a pressure source connected with the cylinder of the displacement device and a control and regulating device between the pressure source and the displacement device for controllably adjusting the pressure acting on the control piston of the displacement device.

10. The hydrodynamic retarder of claim 1, wherein the eccentrically displaceable stator blade wheel has a terminal end position of displacement by the displacement device wherein the stator blade wheel is centered and aligned opposite the rotor blade wheel in the brake housing.

11. The hydrodynamic retarder of claim 1, further comprising means enabling emptying of operating liquid from within the brake housing and from between the rotor blade wheel and the stator blade wheel.

12. The hydrodynamic retarder comprising a housing for containing operating liquid;
   a rotor blade wheel supported for rotation in the housing and including rotor blading thereon;
   a relatively non-rotating stator blade wheel supported in the housing and including stator blading thereon, the stator balding being opposite the rotor blading, such that the stator blading and the rotor blading may cooperate with the operating liquid for hydrodynamic retarding;
   support means for supporting the stator blade wheel for being displaced eccentrically in position with respect to the rotor blade wheel between more and less aligned conditions thereof;
   a pressurized fluid displacement device connected with the stator blade wheel for adjusting the eccentric position of the stator blade wheel with respect to the rotor blade wheel, and the stator blade wheel exerting a brake reaction force which moves the stator blade wheel eccentrically and the displacement exerting an opposed displacement force, the displacement device being adjustable to apply an adjusted displacement force on the stator blade wheel which is adjustable proportional to a desired braking moment; a support to which the stator blade wheel is supported in the housing, and a pivot connection between the stator blade wheel support and the housing, the pivot connection being eccentric of the stator blade wheel;
   the displacement device being connected with the stator blade wheel support for pivoting the stator blade wheel support with respect to the housing and with respect to the rotor blade wheel for moving the stator blade wheel to be eccentric with respect to the rotor blade wheel.

13. The hydrodynamic retarder of claim 12, wherein the support is so shaped and the stator blade wheel is so positioned on the support that the pivot connection for the support is outside the periphery of the stator blade wheel.

14. The hydrodynamic retarder of claim 12, wherein the displacement device comprises a piston cylinder unit, a controllable pressure supply to the cylinder of the unit, a control piston in the cylinder, the control piston being connected with the support for the stator blade wheel, whereby the pressure in the cylinder acts to supply the displacement force for the displacement device.

15. The hydrodynamic retarder of claim 14, further comprising a control and regulating device between the pressure supply and the cylinder for controllably adjusting the pressure acting on the control piston of the displacement device.

16. A hydrodynamic decelerator including:
   a housing for containing operating fluid;
   a rotatable vane wheel disposed with said housing;
   a relatively stationary vane wheel disposed within said housing and being adjustably displaceable eccentrically with respect to said rotatable vane wheel;
   adjusting means for displacing said relatively stationary vane wheel;
   a plurality of vanes supported in a circular array on said relatively stationary vane wheel and operatively positioned along its circumference;
   said circumference including a major arcuate portion whereat said vanes are disposed with essentially uniform spacing between adjacent vanes;
   said circumference also including a substantial arcuate portion that is void of vanes;
   said substantial arcuate portion being disposed between opposite ends of said major arcuate portion and being relatively minor as compared to the latter;
   said substantial arcuate portion being significant longer arcuately than said uniform spacing between adjacent vanes thereby establishing asymmetry in said circular array.

17. A hydrodynamic decelerator as in claim 16 in which the substantial arcuate portion of the circumference is large enough to accommodate at least one vane.

18. A hydrodynamic decelerator as in claim 16 in which said adjusting means moves said relatively stationary vane wheel so that its circular axis moves in a first radial plane;
   said substantial portion of the circumference being disposed so that a second radial plane extends therethrough;
   said second radial plane intersecting the first radial plane along said axis;
   said substantial portion of said circumference being disposed to one side of said first plane 19. A hydrodynamic decelerator as in claim 18 in which the first and second planes are perpendicular to each other.

20. A hydrodynamic decelerator as in claim 18 in which the substantial arcuate portion of the circumference is large enough to accommodate fully at least one vane.

* * * * *